(12) United States Patent
Liu et al.

(10) Patent No.: US 11,202,317 B2
(45) Date of Patent: Dec. 14, 2021

(54) CHANNEL LISTENING METHOD APPLIED TO UNLICENSED FREQUENCY BAND, AND APPARATUS

(71) Applicant: HUAWEI TECHNOLOGIES CO., LTD., Guangdong (CN)

(72) Inventors: Yang Liu, Shenzhen (CN); Yingpei Lin, Shanghai (CN); Lei Huang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/792,406

(22) Filed: Feb. 17, 2020

(65) Prior Publication Data
US 2020/0187255 A1 Jun. 11, 2020

Related U.S. Application Data

(63) Continuation of application No. PCT/CN2018/100885, filed on Aug. 16, 2018.

(30) Foreign Application Priority Data

Aug. 18, 2017 (CN) .......................... 201710714385.1

(51) Int. Cl.
*H04W 74/08* (2009.01)
*H04W 16/14* (2009.01)
*H04W 16/28* (2009.01)

(52) U.S. Cl.
CPC ....... *H04W 74/0825* (2013.01); *H04W 16/14* (2013.01); *H04W 16/28* (2013.01)

(58) Field of Classification Search
CPC . H04W 74/0825; H04W 16/14; H04W 16/28; H04W 74/085; H04W 74/0808; H04W 72/085; H04W 72/046; H04L 5/00
See application file for complete search history.

(56) References Cited

U.S. PATENT DOCUMENTS

2013/0229999 A1 9/2013 Da Silva et al.
2015/0288439 A1 10/2015 Kim et al.
(Continued)

FOREIGN PATENT DOCUMENTS

CN 101207535 A 6/2008
CN 102656941 B 3/2015
(Continued)

OTHER PUBLICATIONS

Huawei et al.,"Coexistence and channel access for NR-based unlicensed band operation",3GPP TSG RAN WG1 NR Ad Hoc Meeting,R1-1711467,Qingdao, China, Jun. 27-30, 2017, total 5 pages.

*Primary Examiner* — Ivan O Latorre
(74) *Attorney, Agent, or Firm* — Womble Bond Dickinson (US) LLP

(57) ABSTRACT

A channel listening method applied to an unlicensed frequency band, and an apparatus are provided, where the method includes: performing, by a communications device, clear channel assessment on a first beam, and in a process of the clear channel assessment, performing, by the communications device, a backoff based on a backoff control parameter for the first beam, where the communications device has a plurality of optional beams, the first beam is one of the plurality of optional beams, and the backoff control parameter is set based on a historical value of a backoff control parameter for at least one of the plurality of optional beams; and after the backoff succeeds, performing, by the communications device, transmission by using the first beam.

15 Claims, 21 Drawing Sheets

(56) References Cited

U.S. PATENT DOCUMENTS

| | | |
|---|---|---|
| 2016/0037560 A1 | 2/2016 | Liu et al. |
| 2016/0135148 A1 | 5/2016 | Novlan et al. |
| 2017/0105163 A1 | 4/2017 | Hu et al. |
| 2017/0171887 A1* | 6/2017 | Shi ..................... H04W 72/046 |
| 2018/0115996 A1* | 4/2018 | Si ..................... H04W 74/0808 |
| 2019/0373635 A1* | 12/2019 | Yang ................... H04B 7/0408 |

FOREIGN PATENT DOCUMENTS

| | | |
|---|---|---|
| CN | 105308880 A | 2/2016 |
| WO | 2017020293 A1 | 2/2017 |
| WO | 2017083489 A1 | 5/2017 |

\* cited by examiner

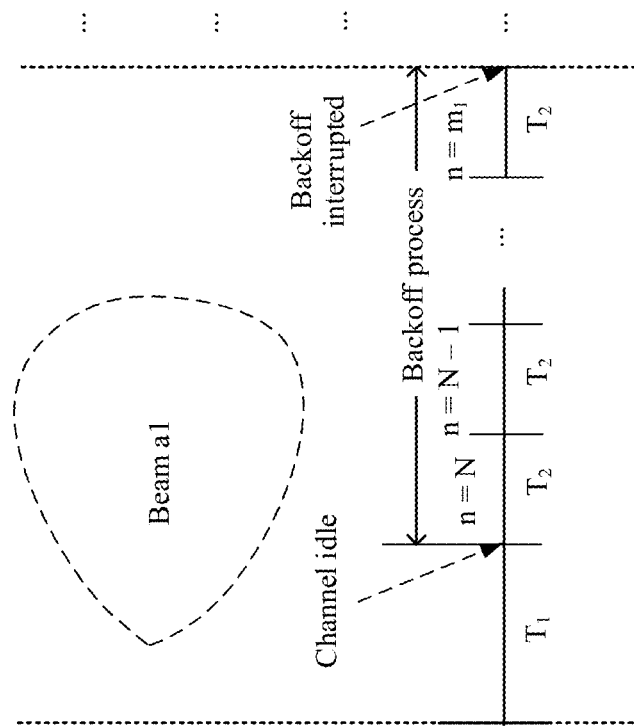

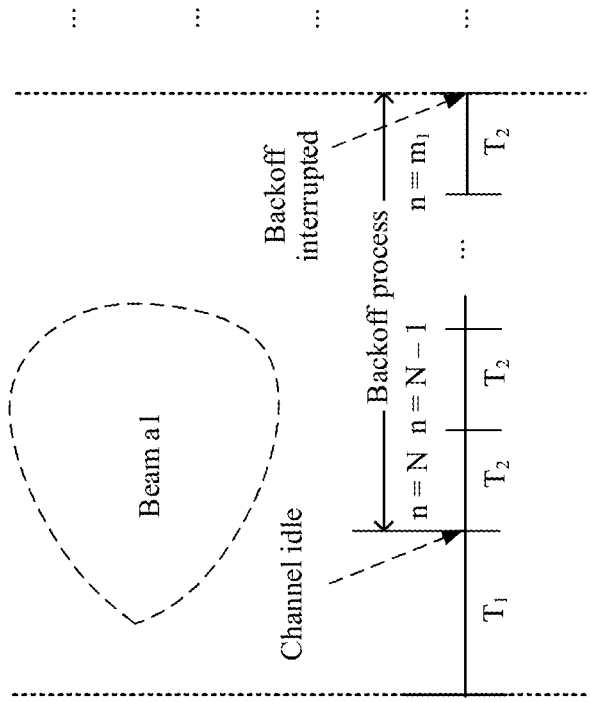

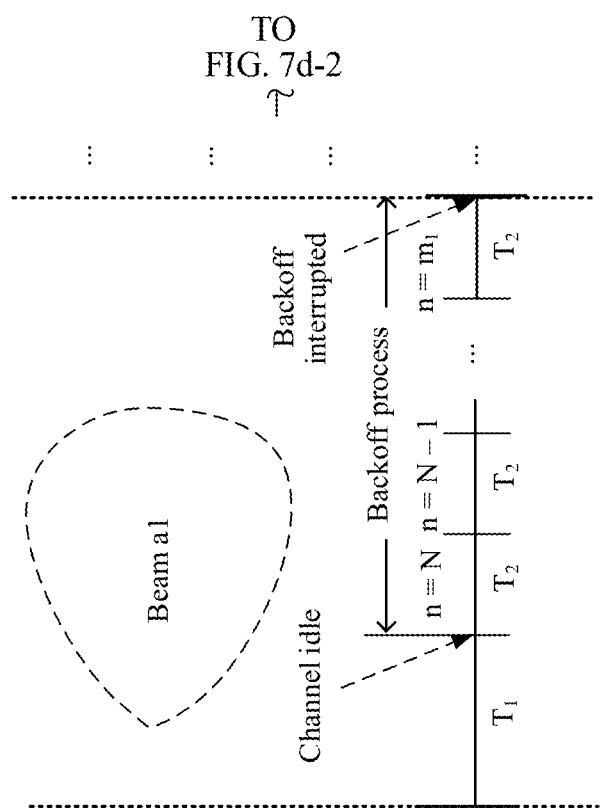

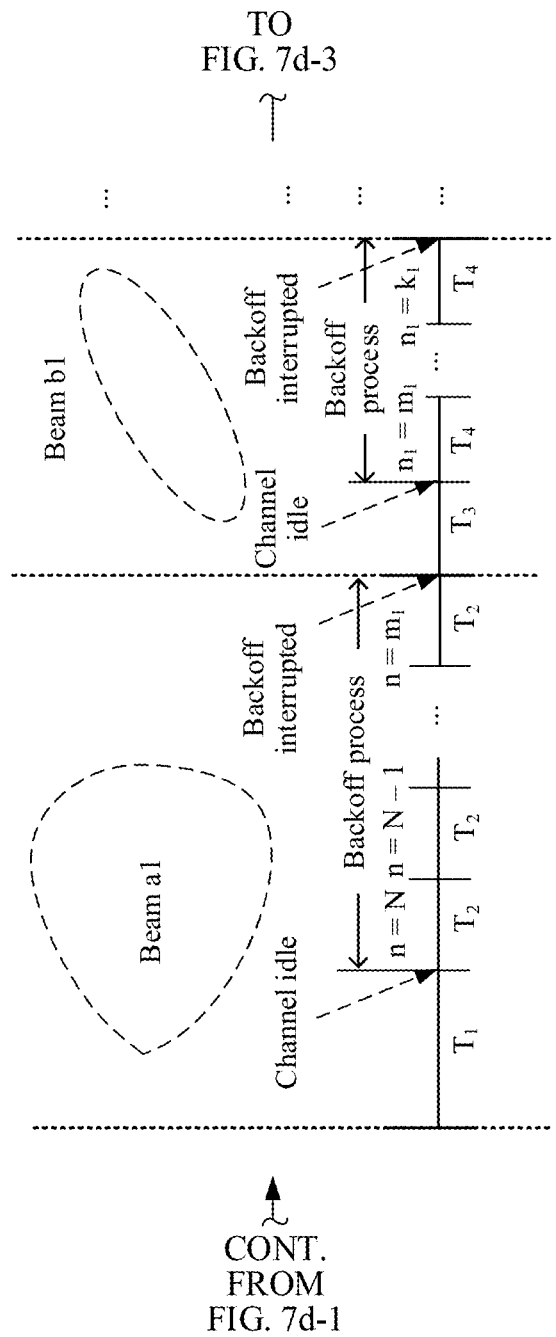

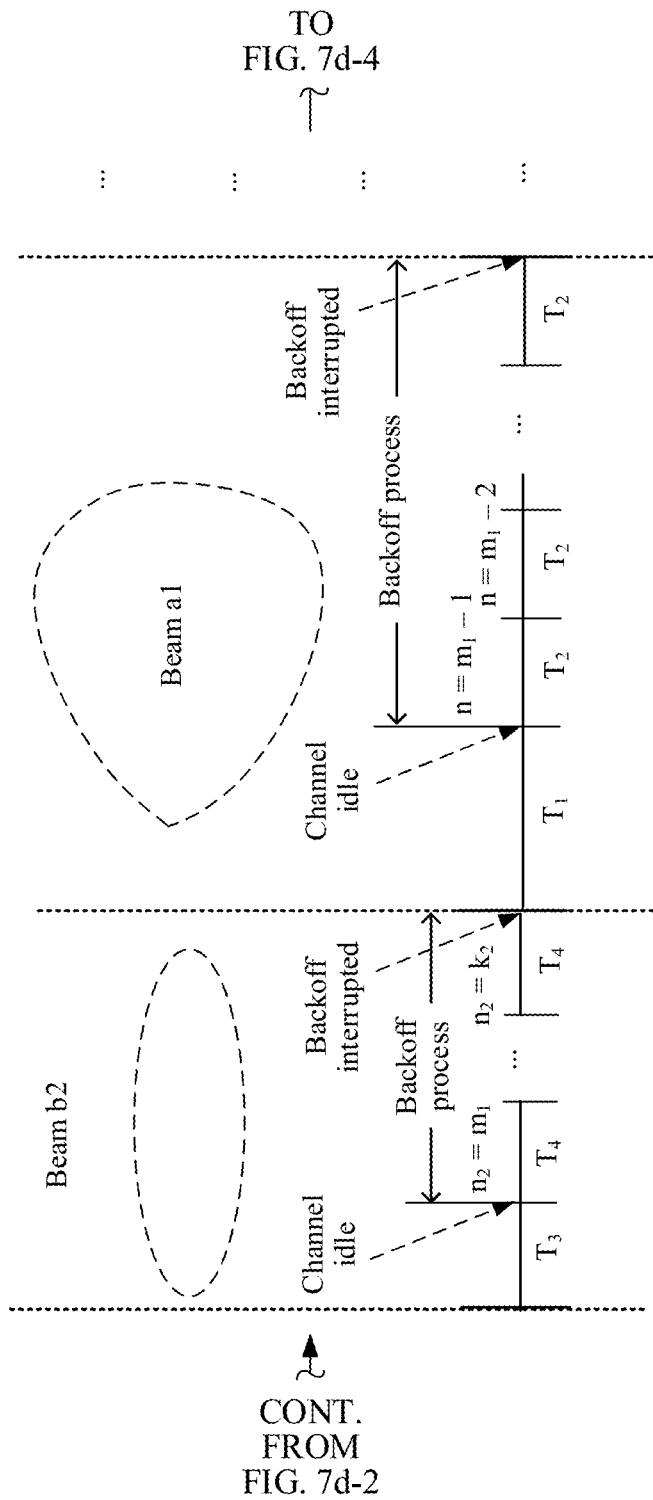

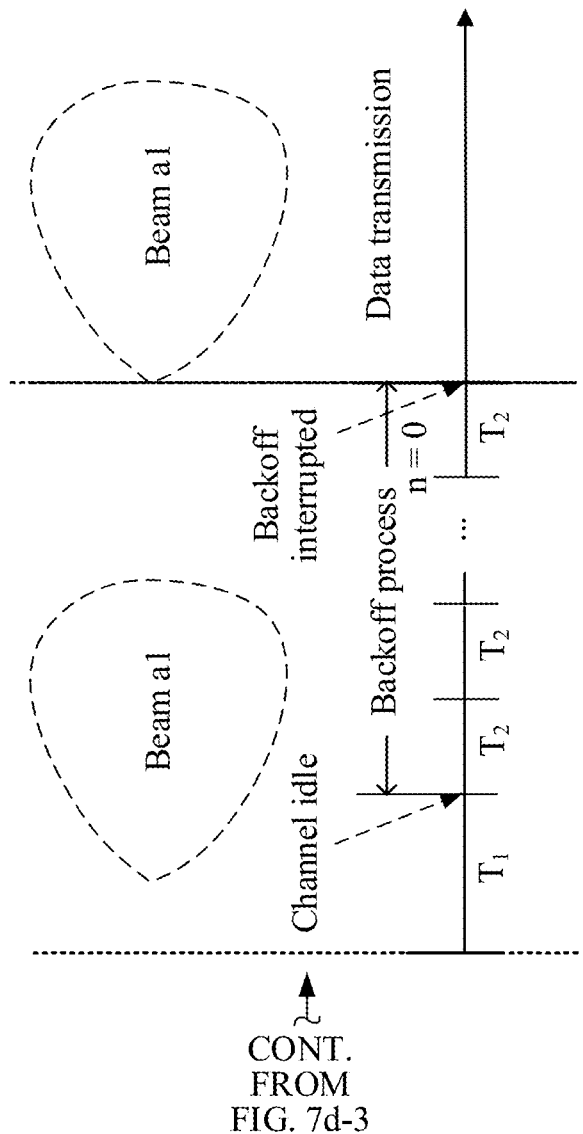

CHANNEL LISTENING METHOD APPLIED TO UNLICENSED FREQUENCY BAND, AND APPARATUS

CROSS-REFERENCE TO RELATED APPLICATIONS

This application is a continuation of International Application No. PCT/CN2018/100885, filed on Aug. 16, 2018, which claims priority to Chinese Patent Application No. 201710714385.1, filed on Aug. 18, 2017. The disclosures of the aforementioned applications are hereby incorporated by reference in their entireties.

TECHNICAL FIELD

The present disclosure relates to the field of wireless communications technologies, and in particular, to a channel listening method applied to an unlicensed frequency band, and an apparatus.

BACKGROUND

In a clear channel assessment (CCA) technology, a possible signal of another device in a channel is discovered through pilot signal detection or energy detection, to determine whether the current channel is idle. For example, a device 1 is sending a signal to a device 2, and a device 3 also wants to send a signal to the device 2; before sending the signal, the device 3 first performs clear channel assessment; after detecting the signal from the device 1, the device 3 determines that a channel is occupied, and then the device 3 does not immediately send the signal to the device 2, so that interference is avoided.

Further, to effectively resolve a collision, a contention backoff mechanism is introduced. For example, after the device 2 performs clear channel assessment at a moment in a period and determines that the channel is idle, the device 2 cannot preempt a resource of the channel at this moment; then the device 2 usually performs a backoff in terms of time, and can transmit data over the resource of the channel only after a value of a backoff counter is 0.

Because a device in the prior art sends a radio wave in all directions by using a conventional omnidirectional antenna, the foregoing clear channel assessment and contention backoff mechanism are designed based on an omnidirectional transmitting/receiving technology. However, in a high frequency (for example, 60 GHz) communications system, due to relatively rapid attenuation of signal strength of an electromagnetic wave and a short transmission distance, a directional transmitting/receiving technology is used for signal transmission to increase a coverage area and effectively suppress interference. In such a directional transceiver system, a beam is usually variable. However, currently, there is no channel listening solution supporting a variable beam.

SUMMARY

The present disclosure provides a channel listening method applied to an unlicensed frequency band, and an apparatus, to provide a channel listening solution supporting a variable beam.

According to a first aspect, the present disclosure provides a channel listening method applied to an unlicensed frequency band. The method includes:

performing, by a communications device, clear channel assessment on a first beam, and in a process of the clear channel assessment, performing, by the communications device, a backoff based on a backoff control parameter for the first beam, where the communications device has a plurality of optional beams, the first beam is one of the plurality of optional beams, and the backoff control parameter is set based on a historical value of a backoff control parameter for at least one of the plurality of optional beams; and after the backoff succeeds, performing, by the communications device, transmission by using the first beam.

In this way, because the historical value of the backoff control parameter for the at least one of the plurality of optional beams is information that is relatively easy to obtain, additional specific information may not be required to determine the backoff control parameter for the first beam based on the historical value. In addition, the backoff control parameter for the first beam is set based on the historical information, to fully adapt to a network status, avoid reducing communication efficiency by randomly selecting a relatively large value when a network is in relatively good condition, and effectively ensure properness of the backoff control parameter for the first beam.

In one embodiment, the plurality of optional beams are divided into a plurality of beam subsets; and the backoff control parameter is set based on a historical value of a backoff control parameter for a beam in another beam subset in the plurality of beam subsets except a beam subset in which the first beam is located and/or a historical value of the backoff control parameter for the first beam.

In this way, the plurality of optional beams are divided into different beam subsets, and the backoff control parameter for the first beam may specifically be set based on the historical value of the backoff control parameter for the beam in the another beam subset and/or the historical value of the backoff control parameter for the first beam, without a need of considering a beam in the beam subset in which the first beam is located, so that processing load is reduced.

In one embodiment, the backoff control parameter is set based on a historical value of a backoff control parameter for a beam that is in the plurality of optional beams and that is associated with the first beam and/or a historical value of the backoff control parameter for the first beam, where the beam associated with the first beam is associated with the first beam based on spatial ranges covered by the beams.

In this way, the backoff control parameter for the first beam is set based on the historical values of the backoff control parameters for the first beam and/or the beam associated with the first beam, so that the backoff control parameter is set on a relatively scientific basis, and properness of the backoff control parameter for the first beam is effectively ensured.

In one embodiment, if neither the backoff control parameter for the beam associated with the first beam nor the backoff control parameter for the first beam has a historical value, the backoff control parameter is set based on a preset upper limit; and the preset upper limit is set based on historical values of backoff control parameters for the plurality of optional beams and/or quantities of times of backoff interruption on the plurality of optional beams.

In this way, the historical values of the backoff control parameters for the plurality of optional beams, the quantities of times of backoff interruption on the plurality of optional beams, and the like can reflect channel quality, so that the preset upper limit in the present disclosure can be flexibly set based on the channel quality and is more proper.

In one embodiment, the method further includes:

updating, by the communications device, the preset upper limit if the communications device determines that a sum of the quantities of times of backoff interruption on the plurality of optional beams is greater than or equal to a first threshold, and/or a sum of the historical values of the backoff control parameters for the plurality of optional beams is greater than or equal to a second threshold.

In this way, the communications device updates the preset upper limit when the update condition is satisfied, so that the preset upper limit can better adapt to a change of the network status.

In one embodiment, the performing, by the communications device, a backoff based on a backoff control parameter for the first beam includes:

if the communications device determines that a quantity of times of backoff interruption on the first beam is greater than or equal to a third threshold, switching, by the communications device, to the beam associated with the first beam to perform clear channel assessment.

In one embodiment, a spatial range covered by the beam associated with the first beam is less than a spatial range covered by the first beam; and the switching, by the communications device, to the beam associated with the first beam to perform clear channel assessment includes:

sequentially performing, by the communications device in ascending order based on historical values of backoff control parameters for beams associated with the first beam, clear channel assessment on the beams associated with the first beam.

In one embodiment, the switching, by the communications device, to the beam associated with the first beam to perform clear channel assessment includes:

switching, by the communications device, to the first beam to perform clear channel assessment if the communications device determines that duration of performing clear channel assessment on the beam associated with the first beam is greater than or equal to a fourth threshold, and/or a quantity of times of backoff interruption during clear channel assessment on the beam associated with the first beam is greater than or equal to a fifth threshold.

According to a second aspect, the present disclosure provides a communications device. The communications device has functions of implementing the foregoing method. The functions may be implemented by hardware, or may be implemented by hardware executing corresponding software. The hardware or the software includes one or more modules corresponding to the foregoing functions. A software module and/or hardware module may be used.

In one embodiment, the communications device includes a processor and a transceiver, where the processor is configured to perform clear channel assessment on a first beam, and in a process of the clear channel assessment, perform a backoff based on a backoff control parameter for the first beam; and the communications device has a plurality of optional beams, the first beam is one of the plurality of optional beams, and the backoff control parameter is set based on a historical value of a backoff control parameter for at least one of the plurality of optional beams; and the transceiver is configured to: after the backoff succeeds, perform transmission by using the first beam.

In one embodiment, the plurality of optional beams are divided into a plurality of beam subsets; and the backoff control parameter is set based on a historical value of a backoff control parameter for a beam in another beam subset in the plurality of beam subsets except a beam subset in which the first beam is located and/or a historical value of the backoff control parameter for the first beam.

In one embodiment, the backoff control parameter is set based on a historical value of a backoff control parameter for a beam that is in the plurality of optional beams and that is associated with the first beam, and/or a historical value of the backoff control parameter for the first beam, where the beam associated with the first beam is associated with the first beam based on spatial ranges covered by the beams.

In one embodiment, if neither the backoff control parameter for the beam associated with the first beam nor the backoff control parameter for the first beam has a historical value, the backoff control parameter is set based on a preset upper limit; and the preset upper limit is set based on historical values of backoff control parameters for the plurality of optional beams and/or quantities of times of backoff interruption on the plurality of optional beams.

In one embodiment, the processor is further configured to:

update the preset upper limit if the processor determines that a sum of the quantities of times of backoff interruption on the plurality of optional beams is greater than or equal to a first threshold, and/or a sum of the historical values of the backoff control parameters for the plurality of optional beams is greater than or equal to a second threshold.

In one embodiment, the processor is specifically configured to:

if the processor determines that a quantity of times of backoff interruption on the first beam is greater than or equal to a third threshold, switch to the beam associated with the first beam to perform clear channel assessment.

In one embodiment, a spatial range covered by the beam associated with the first beam is less than a spatial range covered by the first beam; and the processor is specifically configured to:

sequentially perform, in ascending order based on historical values of backoff control parameters for beams associated with the first beam, clear channel assessment on the beams associated with the first beam.

In one embodiment, the processor is specifically configured to:

switch to the first beam to perform clear channel assessment if the processor determines that duration of performing clear channel assessment on the beam associated with the first beam is greater than or equal to a fourth threshold, and/or a quantity of times of backoff interruption during clear channel assessment on the beam associated with the first beam is greater than or equal to a fifth threshold.

The present disclosure further provides a computer-readable storage medium. The storage medium stores an instruction, and when the instruction runs on a computer, the computer is enabled to perform the communication method provided in any one of the foregoing designs.

The present disclosure further provides a computer program product. The computer program product includes an instruction, and when the instruction runs on a computer, the computer is enabled to perform the communication method provided in any one of the foregoing designs.

The present disclosure further provides a computer program. When the computer program runs on a computer, the computer is enabled to perform the communication method provided in any one of the foregoing designs.

The present disclosure further provides a chip, including a memory and a processor, where the memory is configured to store a computer program; and the processor is configured to invoke the computer program from the memory and run the computer program, so that a communications device in which the chip is installed performs the communication method provided in any one of the foregoing designs.

BRIEF DESCRIPTION OF DRAWINGS

FIG. 7a-1 and FIG. 7a-2 are a schematic diagram in which a communications device successfully performs a backoff on a beam b1;

FIG. 7b-1 and FIG. 7b-2 are a schematic diagram in which a communications device successfully performs a backoff on a beam b2;

FIG. 7c-1 to FIG. 7c-3 are a schematic diagram in which a communications device successfully performs a backoff on a beam b3;

FIG. 7d-1 to FIG. 7d-4 are a schematic diagram in which a communications device switches to a beam a1 and successfully performs a backoff;

DESCRIPTION OF EMBODIMENTS

The following describes the present disclosure in detail with reference to the accompanying drawings in the specification.

Figure 1:
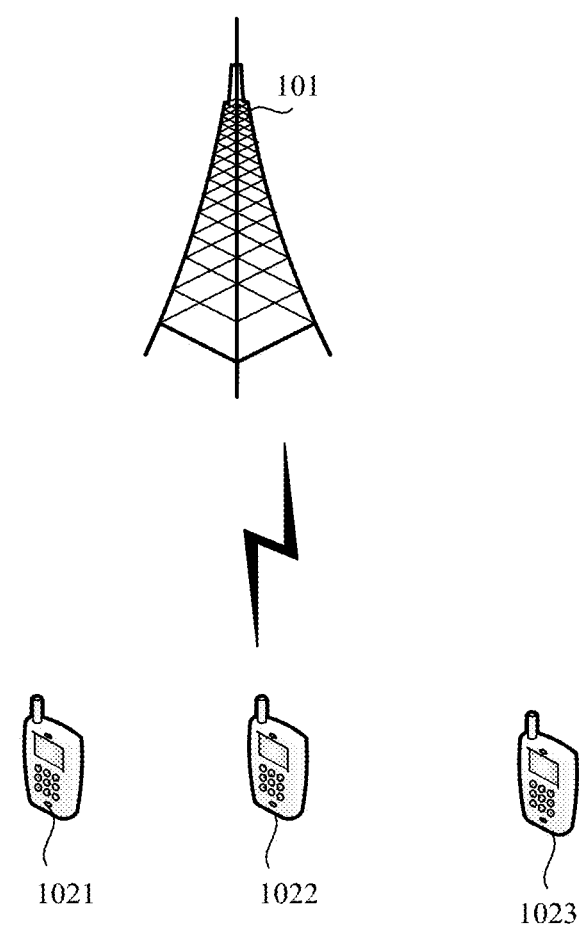
FIG. 1 is a schematic diagram of a network architecture to which the present disclosure is applied.

A channel listening method in the present disclosure can be applied to a plurality of system architectures. FIG. 1 is a schematic diagram of a network architecture to which the present disclosure is applied. As shown in FIG. 1, the network architecture includes a network device 101 and at least one terminal, such as a terminal 1021, a terminal 1022, and a terminal 1023 shown in FIG. 1, connected to the network device 101. The network device 101 may perform data transmission with any one of the terminal 1021, the terminal 1022, and the terminal 1023.

In the present disclosure, the network device may be a base station (BS) device. The base station device may also be referred to as a base station, and is an apparatus deployed in a radio access network to provide a wireless communication function. For example, a device that provides a base station function in a 5G network includes one or more of the following: a new radio NodeB (gNB), a centralized unit (CU), and a distributed unit.

The terminal is a device having a wireless transceiver function. The terminal may be deployed on land, including an indoor or outdoor device, a handheld device, or a vehicle-mounted device, or may be deployed on the water (for example, a ship), or may be deployed in the air (for example, an airplane, a balloon, or a satellite). The terminal may be a mobile phone, a tablet, a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like.

Figure 2:
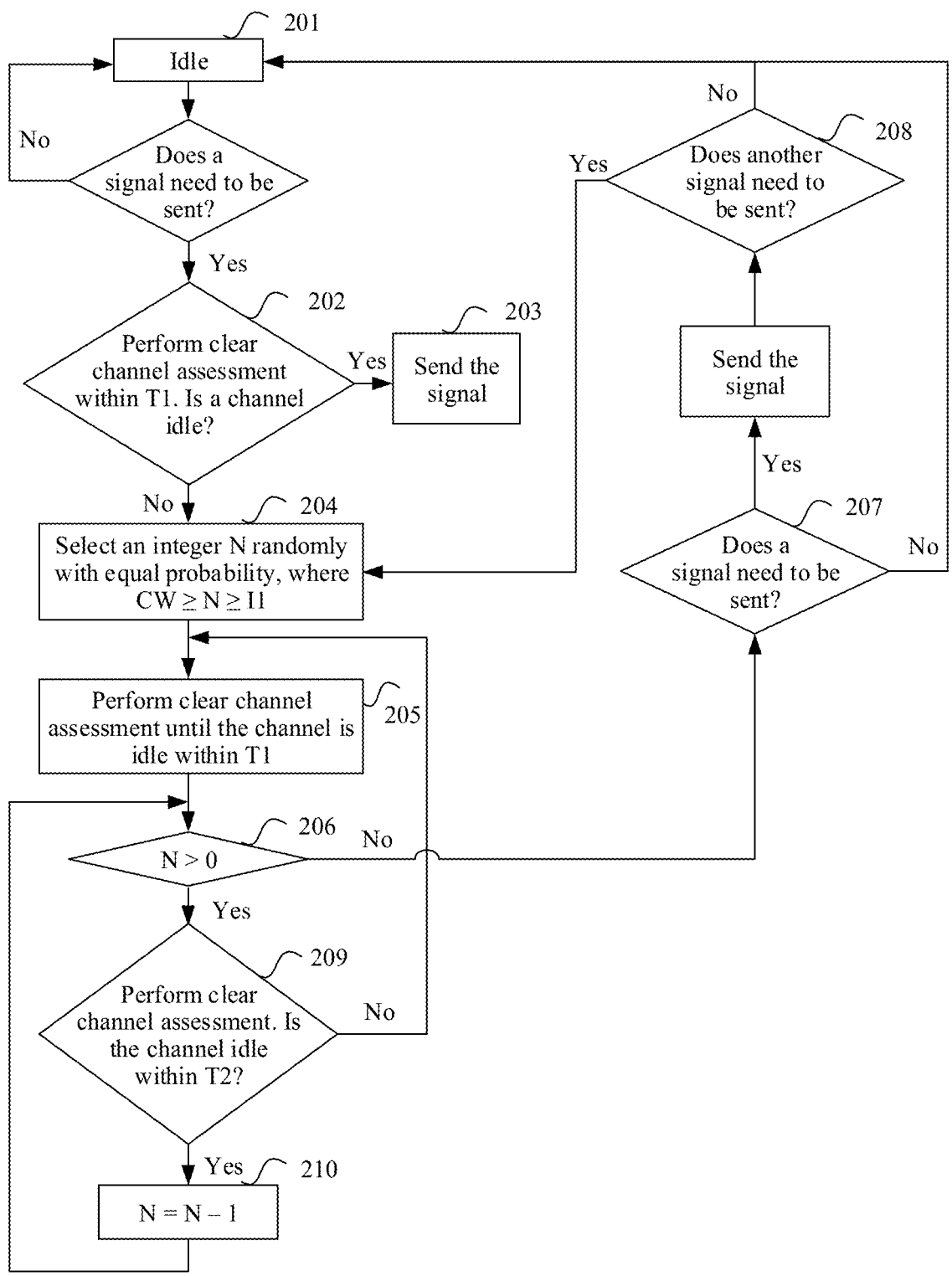
FIG. 2 is a schematic flowchart of clear channel assessment in the prior art.

In the system architecture shown in FIG. 1, the network device 101 may communicate with any one of the terminal 1021, the terminal 1022, and the terminal 1023. In an application scenario of an unlicensed frequency band, communication between the network device 101 and the terminal 1021 is used as an example. After determining that there is data or signaling that needs to be sent to the terminal 1021, the network device 101 needs to perform clear channel assessment. Similarly, after determining that there is data or signaling that needs to be sent to the network device 101, the terminal 1021 also needs to perform clear channel assessment. In the following implementations, the network device and the terminal device are collectively referred to as "communications devices". Referring to FIG. 2, a clear channel assessment method specifically includes:

Operation 201: A communications device is in an idle state, and if data or a signal needs to be sent, operation 202 is performed.

Operation 202: The communications device first performs clear channel assessment on a channel within a preset time length T1, and if the channel is idle, operation 203 is performed; if the channel is not idle, operation 204 is performed.

Operation 203: The communications device sends the data or the signal through the channel, and operation 208 is performed.

Operation 204: The communications device selects, randomly with equal probability, an integer N within a pre-specified range of a lower limit (namely, I1, which is a non-negative integer) to an upper limit (namely, CW), namely, CW≥N≥I1, and sets a backoff control parameter to N. The setting a backoff control parameter to N specifically means setting a value of a backoff counter to N.

Operation 205: The communications device continually performs clear channel assessment on the channel until the communications device finds, within T1, that the channel is idle, and operation 206 is performed.

Operation 206: If N>0, operation 209 is performed; if N=0, operation 207 is performed.

Operation 207: If a signal needs to be sent, the signal is sent, and operation 208 is performed; if a signal does not need to be sent, operation 201 is performed.

Operation 208: If another signal needs to be sent, operation 204 is performed; if no other signal needs to be sent, operation 201 is performed.

Operation 209: Clear channel assessment is performed on the channel within T2, and if the channel is idle within T2, operation 210 is performed; if the channel is not idle within T2, operation 205 is performed.

Operation 210: The value of the backoff counter decrements by 1, that is, N=N−1, and operation 206 is performed.

It can be learned from the foregoing procedure that, the backoff control parameter is selected, randomly with equal probability, within the prespecified range of the lower limit to the upper limit, and if a randomly selected value is relatively large, a backoff time is relatively long.

Based on this, the present disclosure provides a channel listening method, to resolve a technical problem that communication efficiency may be relatively low because a value of a backoff counter is randomly selected. Specifically, in the channel listening method of the present disclosure, a backoff control parameter for a first beam is set based on a historical value of a backoff control parameter for at least one of a plurality of optional beams. Because the historical value of the backoff control parameter for the at least one of the plurality of optional beams is information that is relatively easy to obtain, additional specific information may not be required to determine the backoff control parameter for the first beam based on the historical value. In addition, the backoff control parameter for the first beam is set based on the historical information, to fully adapt to a network status, avoid reducing communication efficiency by randomly selecting a relatively large value when a network is in relatively good condition, and effectively ensure properness of the backoff control parameter for the first beam.

It should be noted that a communications device in the present disclosure may be the network device 101 in the system architecture shown in FIG. 1, or may be any one of the terminal 1021, the terminal 1022, and the terminal 1023. This is not specifically limited.

Figure 3:
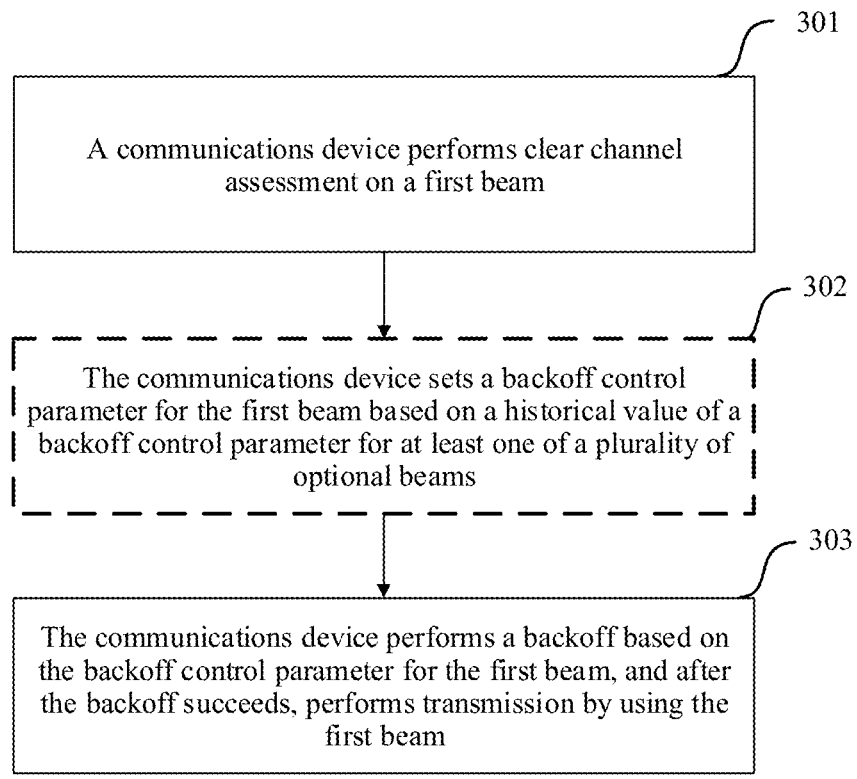
FIG. 3 is a schematic flowchart corresponding to a channel listening method according to the present disclosure.

FIG. 3 is a schematic flowchart corresponding to a channel listening method according to the present disclosure. As shown in FIG. 3, the method includes:

Operation 301: A communications device performs clear channel assessment on a first beam, where the first beam may be any beam in a set of optional beams, and the set of optional beams may be a predefined set including a plurality of optional beams.

Operation 302: The communications device sets a backoff control parameter for the first beam, that is, sets a value of a backoff counter for the first beam, based on a historical value of a backoff control parameter for at least one of the plurality of optional beams.

Operation 303: The communications device performs a backoff based on the value of the backoff counter for the first beam, and after the backoff succeeds, the communications device performs transmission by using the first beam.

It should be noted that operation 302 described above is an optional operation, and operation 302 may not be included in another embodiment.

In a first possible implementation, the plurality of beams may be divided into two or more beam subsets, and any beam subset includes at least one beam. The beam subsets may be obtained through division based on beam widths. For example, beams whose widths are similar or the same may be placed into a same beam subset. A beam width is specifically a spatial range that can be effectively covered by a beam. In this way, in operation 302, the communications device may set the value of the backoff counter for the first beam based on a historical value of a backoff control parameter for a beam in another beam subset in a plurality of beam subsets except a beam subset in which the first beam is located and/or a historical value of the backoff control parameter for the first beam.

In a second possible implementation, the communications device may set the value of the backoff counter for the first beam based on a historical value of a backoff control parameter for a beam that is in the plurality of optional beams and that is associated with the first beam and/or a historical value of the backoff control parameter for the first beam. An association relationship between different beams in the plurality of optional beams may be predefined, or different beams in the plurality of optional beams may be associated with each other based on spatial ranges covered by the beams. This is not specifically limited.

With reference to the first and the second possible implementations, the present disclosure provides a third possible implementation. The following mainly describes the third possible implementation in detail. For related content in the first and the second possible implementations, refer to the third possible implementation.

Figure 4A:
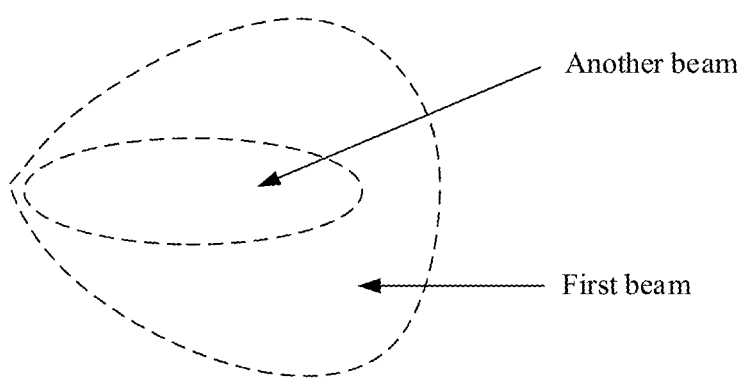
FIG. 4a is a schematic diagram of an association relationship in which a first beam covers another beam.
Figure 4B:
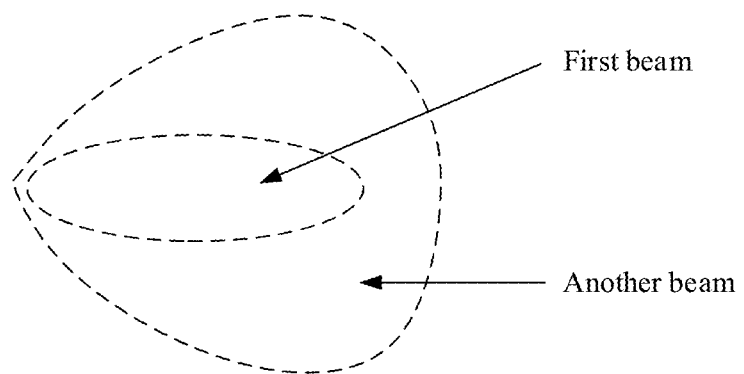
FIG. 4b is a schematic diagram of an association relationship in which another beam covers a first beam.

In the third possible implementation, the first beam may be associated with one or more beams in another beam subset in the plurality of beam subsets except the beam subset in which the first beam is located. In this implementation, that the first beam is associated with another beam may specifically mean that the first beam covers the another beam (as shown in FIG. 4a). In this case, a spatial range covered by the first beam is larger than that covered by the another beam. Alternatively, that the first beam is associated with another beam may mean that the first beam is covered by the another beam (as shown in FIG. 4b). In this case, a spatial range covered by the first beam is smaller than that covered by the another beam.

For example, the set of optional beams includes a beam subset a and a beam subset b, the beam subset a includes a beam a1, a beam a2, and a beam a3, and the beam subset b includes a beam b1, a beam b2, a beam b3, a beam b4, a beam b5, a beam b6, and a beam b7. There is an association relationship between the beams in the beam subset a and the beams in the beam subset b, as shown in Table 1.

TABLE 1

Example of the association relationship between the beams in the beam subset a and the beams in the beam subset b

| Beams in the beam subset a | Beams in the beam subset b |
|---|---|
| a1 | b1 |
|  | b2 |
|  | b3 |
| a2 | b3 |
|  | b4 |
|  | b5 |
| a3 | b5 |
|  | b6 |
|  | b7 |

Figure 4C:
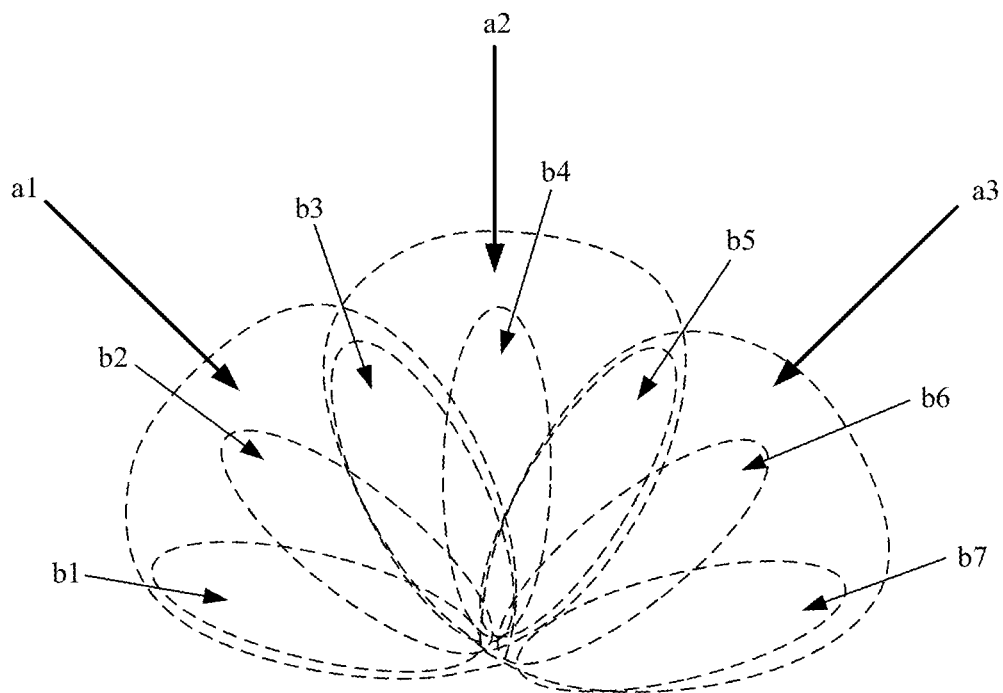
FIG. 4c is a schematic diagram of an association relationship between beams.

It can be learned from content in Table 1 that the beam a1 is associated with the beam b1, the beam b2, and the beam b3; the beam a2 is associated with the beam b3, the beam b4, and the beam b5; and the beam a3 is associated with the beam b5, the beam b6, and the beam b7. Further, for a schematic diagram of the association relationship between the beams, refer to FIG. 4c.

In this implementation, in operation 302, the communications device may set the value of the backoff counter for the first beam based on a historical value of a backoff control parameter for a beam that is in another beam subset and that is associated with the first beam and/or the historical value of the backoff control parameter for the first beam.

Specifically, there may be one or more beams that are in the another beam subset and that are associated with the first beam. If there are a plurality of beams associated with the first beam, the following three cases may exist: (1) Backoff counters for the plurality of beams associated with the first beam each have a historical value. To be specific, before performing a backoff on the first beam, the communications device has performed a backoff process on each of the plurality of beams associated with the first beam, and the backoff is interrupted. (2) Backoff counters for some of the plurality of beams associated with the first beam each have a historical value; backoff counters for the other beams do not have a historical value. To be specific, before performing a backoff on the first beam, the communications device has performed a backoff process on each of the some beams associated with the first beam, and the backoff is interrupted; a backoff process has not been performed on the other beams, or a backoff process has been performed, and the backoff succeeds. (3) Backoff counters for some of the plurality of beams associated with the first beam do not have a historical value.

With reference to the first beam, if the backoff counter for the first beam has a historical value, in Case (1) and Case (2), the communications device may set a smallest value, in historical values of backoff counters for the beams associated with the first beam and the historical value of the backoff counter for the first beam, to the value of the backoff counter for the first beam. In Case (1), the historical values of the backoff counters for the beams associated with the first beam are historical values of the backoff counters for all beams associated with the first beam; in Case (2), the historical values of the backoff counters for the beams associated with the first beam are historical values of the backoff counters for the some beams associated with the first beam; in Case (3), the communications device may set the historical value of the backoff counter for the first beam to the value of the backoff counter for the first beam.

If the backoff counter for the first beam does not have a historical value, in Case (1) and Case (2), the communications device may set a smallest value in historical values of backoff counters for the beams associated with the first beam to the value of the backoff counter for the first beam; in Case (3), the communications device may set the value of the backoff counter for the first beam based on a preset upper limit.

An example in which the first beam is the beam b3 shown in Table 1 is used as an example, and beams associated with the beam b3 are the beam a1 and the beam a2. Before the communications device performs a backoff on the beam b3, a value of a backoff counter is 5 when a backoff on the beam a1 is interrupted, and a value of a backoff counter is 4 when a backoff on the beam a2 is interrupted. In this case, if a backoff counter for the beam b3 does not have a historical value, the communications device may set a smallest value (namely, 4) in the historical values of the backoff counters for the beam a1 and the beam a2 to a value of the backoff counter for the beam b3. If a historical value of the backoff counter for the beam b3 is 3, the communications device may set a smallest value (namely, 3) in the historical values of the backoff counters for the beam a1, the beam a2, and the beam b3 to a value of the backoff counter for the beam b3.

For the preset upper limit (namely, CW) in the foregoing description, in the prior art, after one backoff succeeds, the preset upper limit may be adjusted before a next backoff. A condition and rule for adjusting the preset upper limit generally conforms to a principle of "a busier channel requires a larger preset upper limit". For example, in a Wi-Fi system, after a backoff succeeds (and a channel is accessed), if a NACK signal is received, the upper limit is increased to next 2n−1 (n is a positive integer). If an ACK signal is received, the upper limit is reset to an initial value. In an LAA system, after a backoff succeeds (and a channel is accessed), if a percentage of NACK signals in ACK/NACK signals that have been received exceeds a specific threshold, the upper limit is adjusted to a next value in a given incremental list. It can be learned that, in the prior art, the preset upper limit is adjusted based on the received ACK/NACK signals.

Based on this, the present disclosure provides an implementation of updating the preset upper limit. The preset upper limit may be generated by the communications device based on historical values of backoff counters for beams and/or quantities of times of backoff interruption on beams in the set of optional beams. For example, the preset upper limit may be a preset function value (for example, an average, a median, or a maximum/minimum) of the historical values of the backoff counters for the beams. For another example, the preset upper limit may be a preset function value (for example, an average, a median, or a maximum/minimum) of the quantities of times of backoff interruption on the beams. The historical values of the backoff counters for the beams, the quantities of times of backoff interruption on the beams, and the like can reflect channel quality, so that the preset upper limit in the present disclosure can be flexibly set based on the channel quality and is more proper.

Further, the communications device may update the preset upper limit based on a specified period or when an update condition is satisfied. That an update condition is satisfied may mean: the communications device determines that a quantity of times of backoff interruption on each beam in the set of optional beams is greater than or equal to a first threshold, and/or the communications device determines that the preset function value of the historical values of the backoff counters for the beams in the set of optional beams is greater than or less than a preset threshold. For example, a sum of the historical values of the backoff counters for the beams is greater than or equal to a second threshold. Both the first threshold and the second threshold may be set by a person skilled in the art based on an actual situation, and this is not specifically limited.

In the present disclosure, because there are a plurality of beams in the set of optional beams, the communications device may switch between different beams. There may be a plurality of specific switching manners. For example, the communications device performs a backoff based on the value of the backoff counter for the first beam, and if the communications device determines that a quantity of times of backoff interruption on the first beam is greater than or equal to a third threshold, the communications device switches to the beam associated with the first beam to perform clear channel assessment. The beam associated with the first beam may be a beam covering the first beam, or may be a beam covered by the first beam.

The following specifically describes, with reference to specific embodiments, a case in which the communications device switches between different beams in the present disclosure.

Figure 5:
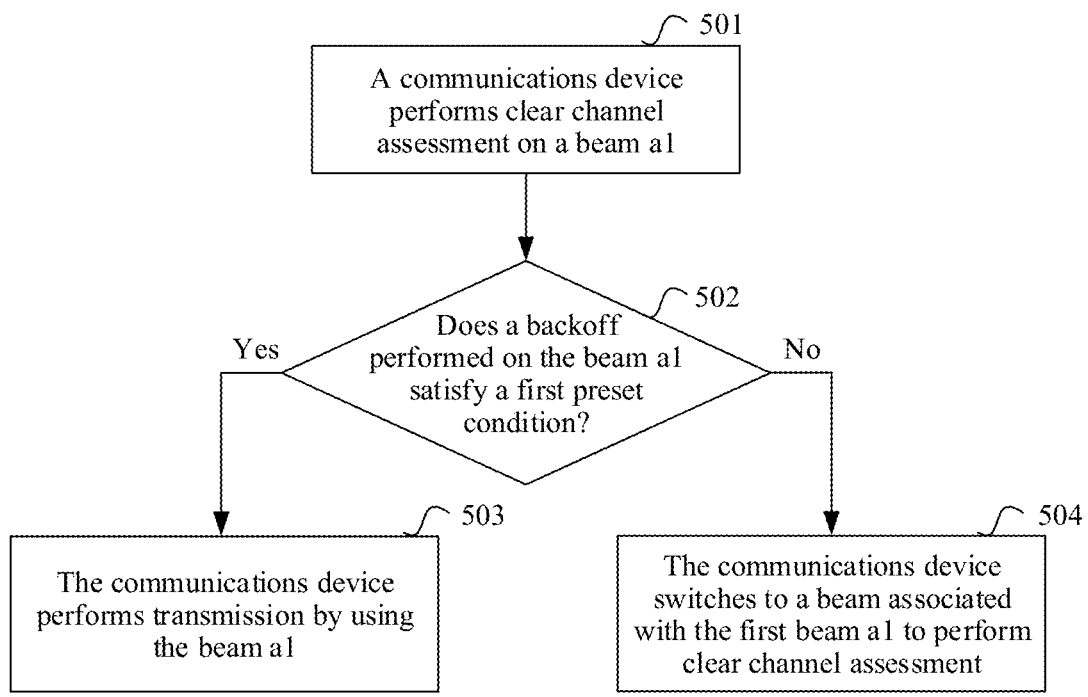
FIG. 5 is a schematic flowchart corresponding to beam switching according to an embodiment of the present disclosure.

FIG. 5 is a schematic flowchart corresponding to beam switching according to an embodiment of the present disclosure. As shown in FIG. 5, the following operations are included.

Operation 501: A communications device performs clear channel assessment on the beam a1.

Operation 502: The communications device determines whether a backoff performed on the beam a1 satisfies a first preset condition; if the first preset condition is satisfied, operation 503 is performed; if the first preset condition is not satisfied, operation 504 is performed.

Figure 6A:
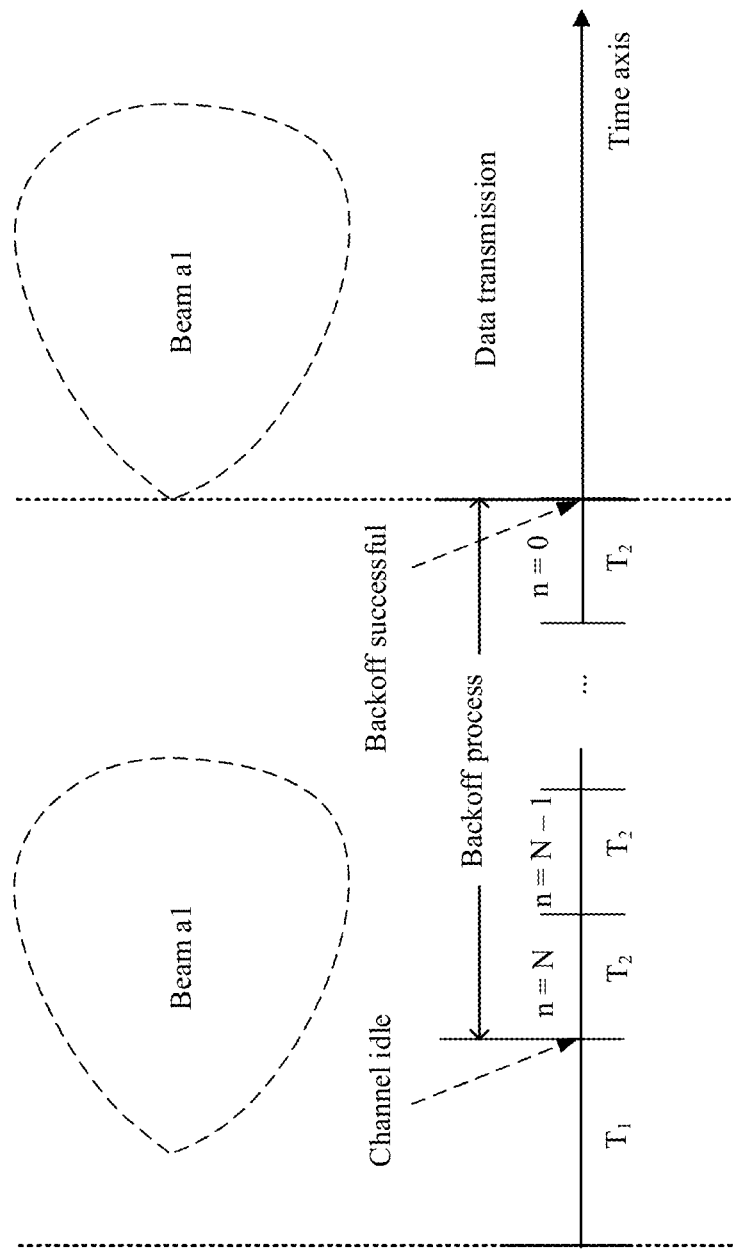
FIG. 6a is a schematic diagram of a first case in which a communications device successfully performs a backoff on a beam a1.
Figure 6B:
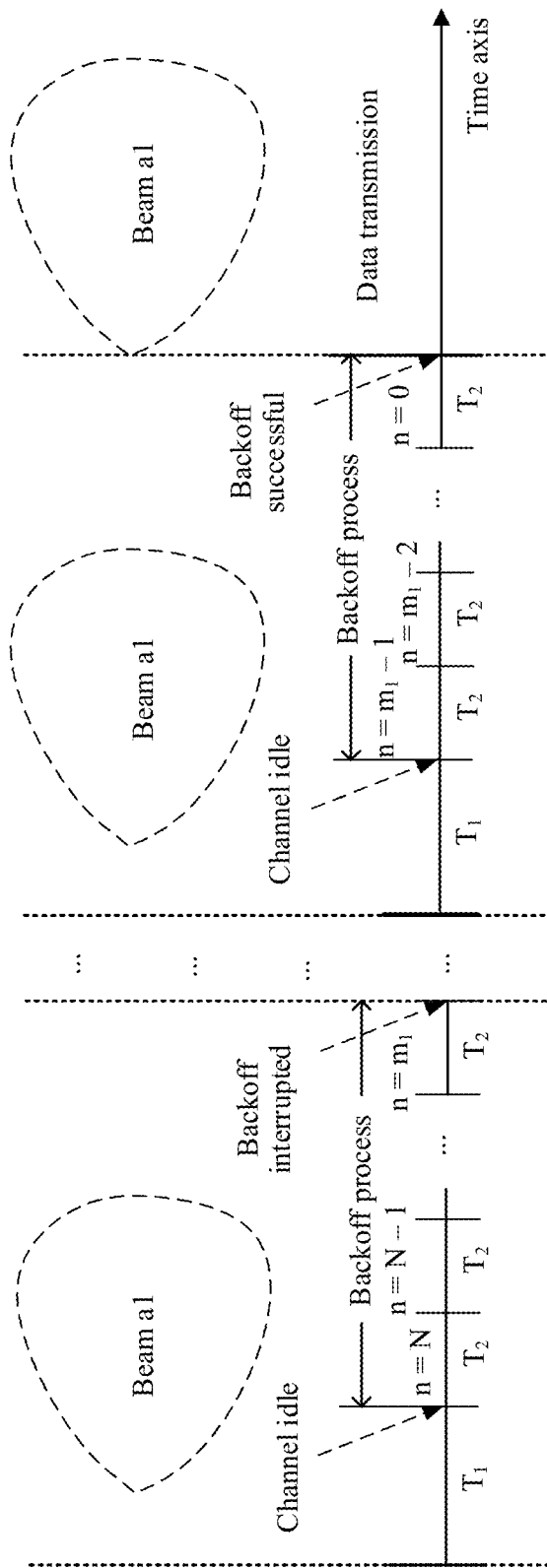
FIG. 6b is a schematic diagram of a second case in which a communications device successfully performs a backoff on a beam a1.

That a backoff performed by the communications device on the beam a1 satisfies a first preset condition may specifically be any one of the following cases: (1) The communications device performs clear channel assessment on the beam a1, where a listening result within a time period T1 is that a channel is idle, and successfully performs a backoff based on a set value (which may specifically be set by using the method described in FIG. 3) of a backoff counter, referring to FIG. 6a. (2) The communications device performs clear channel assessment on the beam a1, where a listening result within a time period T1 is that a channel is idle; the communications device performs a backoff based on a set value of a backoff counter, and when a value of the backoff counter is m1, the backoff is interrupted; then the communications device performs clear channel assessment on the beam a1 again and performs a backoff until the backoff succeeds, referring to FIG. 6b. In Case (1), the communications device successfully performs one backoff on the beam a1, and the backoff is not interrupted. In Case (2), one or more backoffs performed by the communications device on the beam a1 may be interrupted, provided that a preset restrictive condition is satisfied. The preset restrictive condition may be any one or any combination of the following: The communications device successfully performs a backoff within a preset time length; a quantity of times of backoff interruption of the communications device on the beam a1 is greater than or equal to a third threshold.

Operation 503: The communications device performs data transmission by using the beam a1.

Operation 504: The communications device switches to a beam associated with the beam a1 to perform clear channel assessment.

In operation 504, specifically, beams associated with the beam a1 are the beam b1, the beam b2, and the beam b3, and the communications device may switch to the beam b1, the beam b2, or the beam b3 to perform clear channel assessment.

Figure 8A:
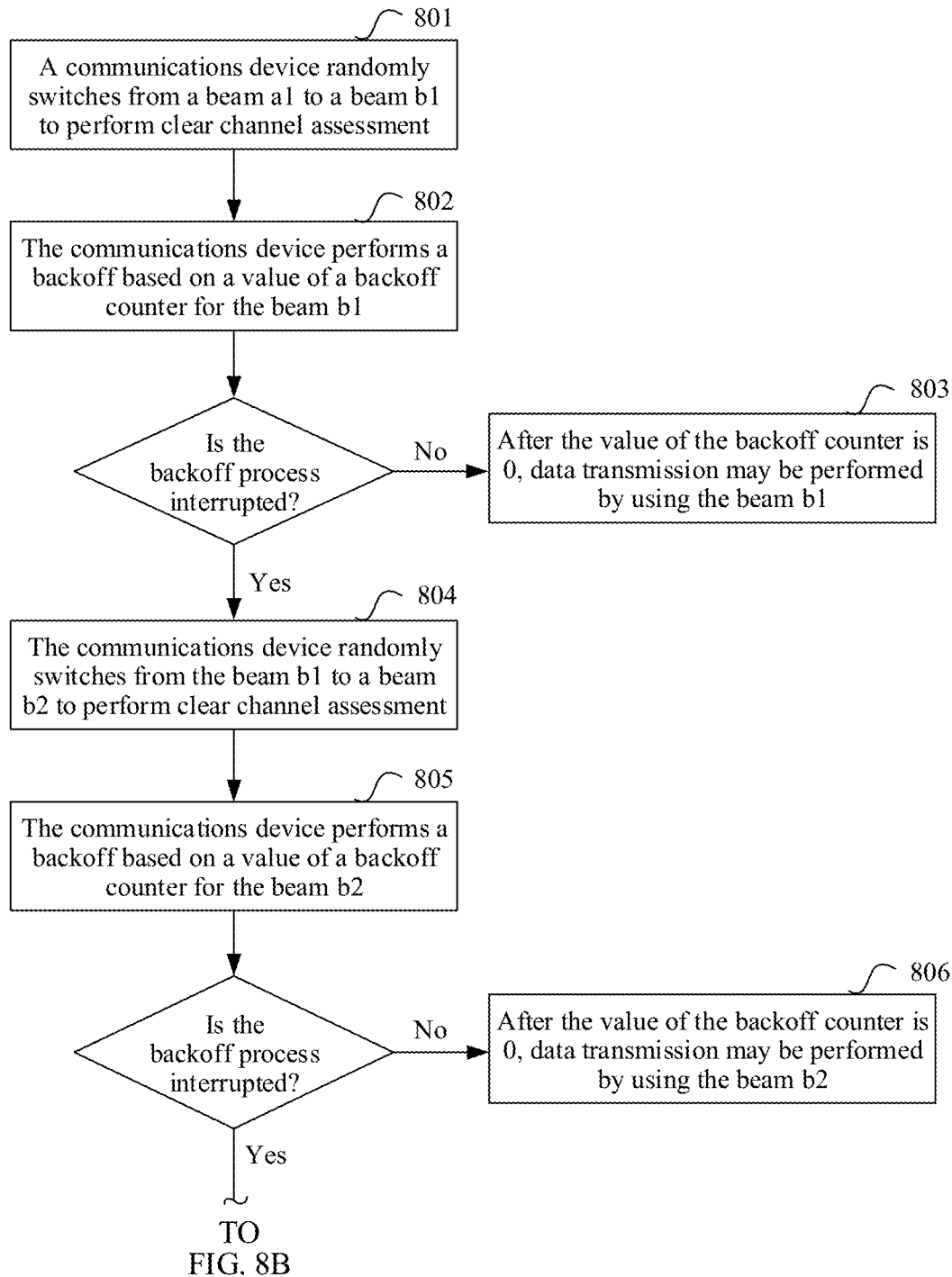
FIG. 8A and FIG. 8B are a schematic diagram of a specific procedure in which a communications device performs clear channel assessment on a beam associated with a beam a1.
Figure 8B:
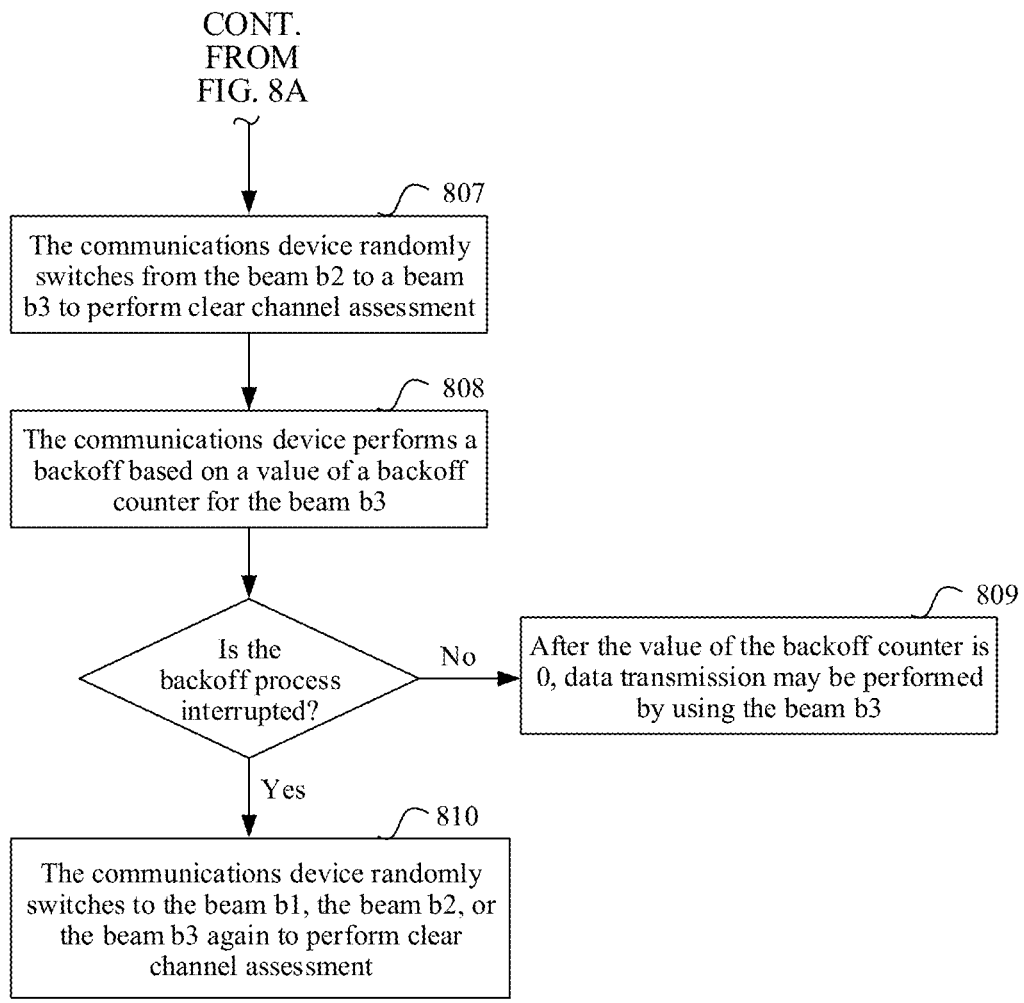

In one embodiment, the communications device randomly switches to the beam b1, the beam b2, or the beam b3 to perform clear channel assessment. In this implementation, for a specific procedure in which the communications device performs clear channel assessment on the beam associated with the beam a1, refer to FIG. 8A and FIG. 8B. As shown in FIG. 8A and FIG. 8B, the following operations are included.

Operation 801: The communications device randomly switches from the beam a1 to the beam b1 to perform clear channel assessment.

Operation 802: The communications device performs a backoff based on a value of a backoff counter for the beam b1, and if the backoff process is not interrupted, operation 803 is performed; if the backoff process is interrupted, operation 804 is performed.

Figures 2, 7A:
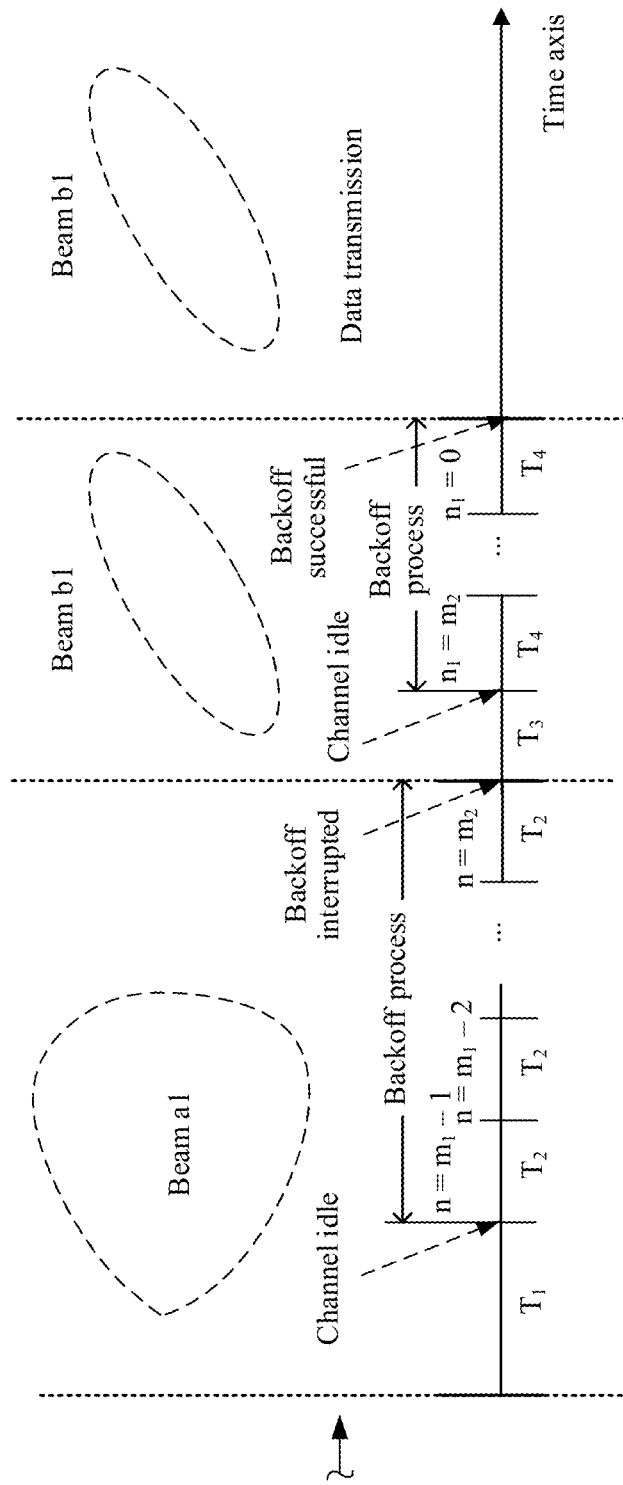

Operation 803: After the value of the backoff counter is 0, data transmission is performed by using the beam b1 (refer to FIG. 7a-1 and FIG. 7a-2).

Operation 804: The communications device randomly switches from the beam b1 to the beam b2 to perform clear channel assessment.

Operation 805: The communications device performs a backoff based on a value of a backoff counter for the beam b2, and if the backoff process is not interrupted, operation 806 is performed; if the backoff process is interrupted, operation 807 is performed.

Figures 2, 7B:
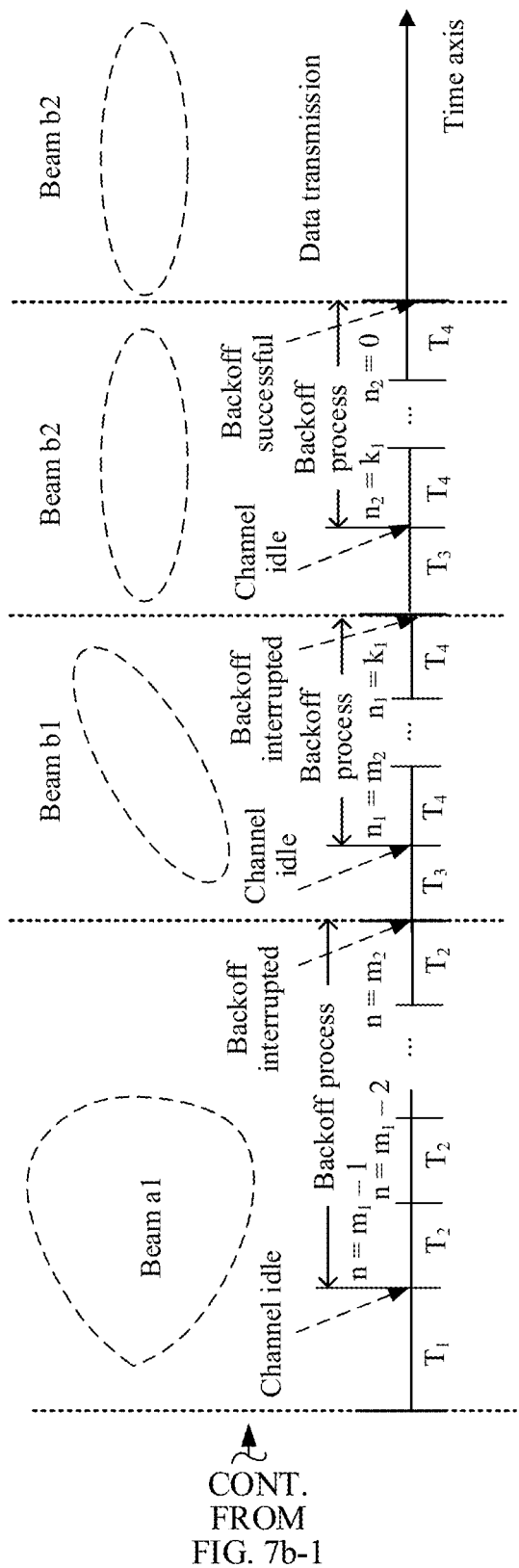

Operation 806: After the value of the backoff counter is 0, data transmission is performed by using the beam b2 (refer to FIG. 7b-1 and FIG. 7b-2).

Operation 807: The communications device randomly switches from the beam b2 to the beam b3 to perform clear channel assessment.

Operation 808: The communications device performs a backoff based on a value of a backoff counter for the beam b3, and if the backoff process is not interrupted, operation 809 is performed; if the backoff process is interrupted, operation 810 is performed.

Figures 1, 7C:
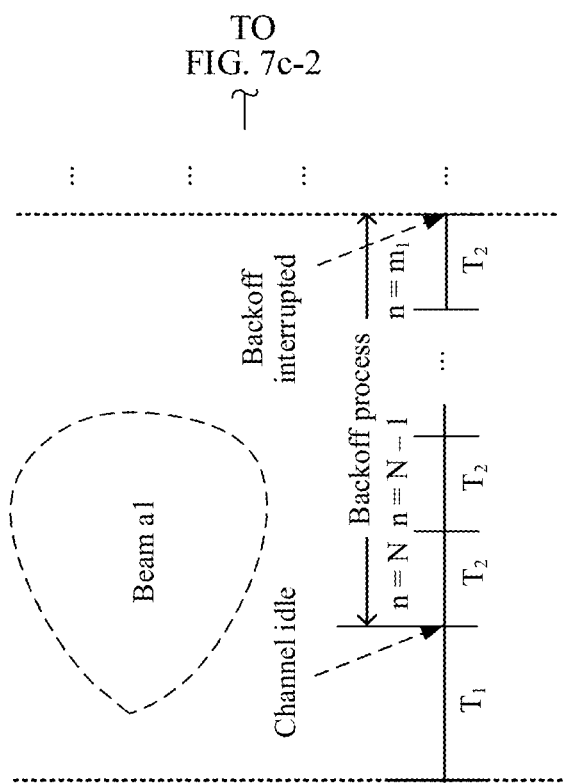
Figures 2, 7C:
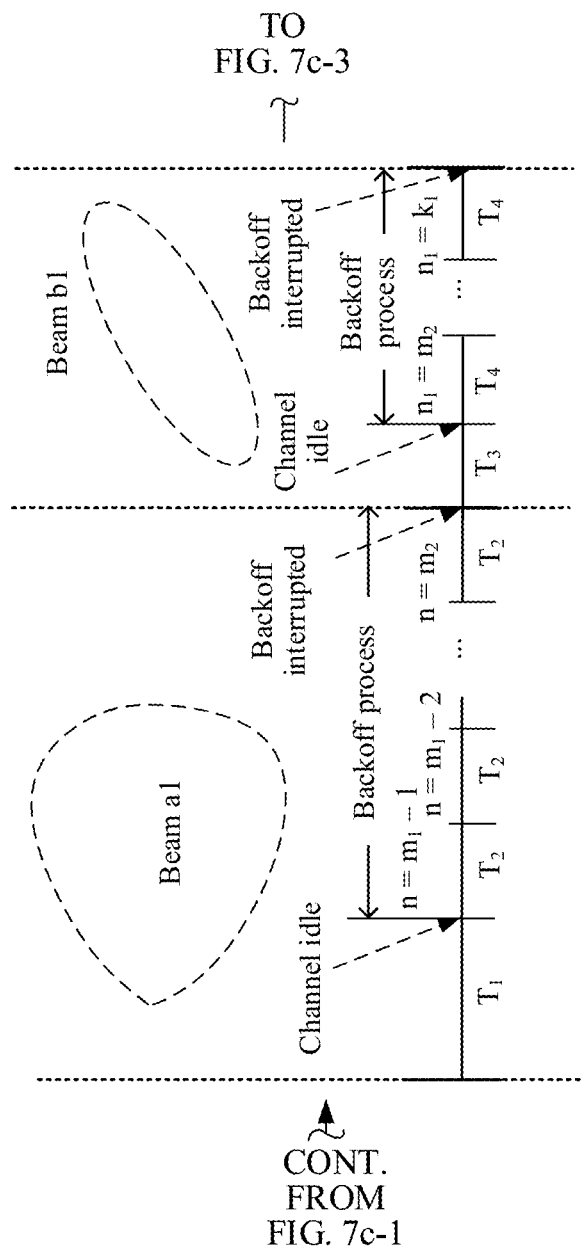
Figures 3, 7C:
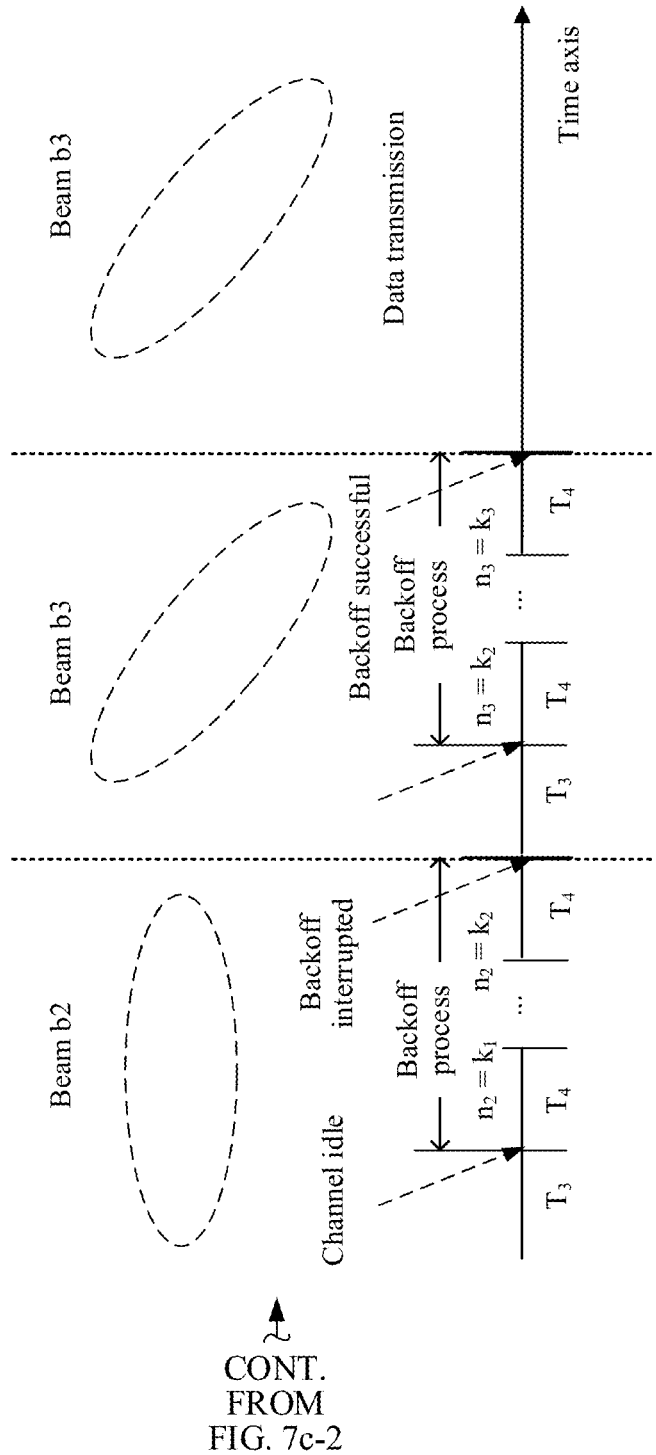

Operation 809: After the value of the backoff counter is 0, data transmission is performed by using the beam b3 (refer to FIG. 7c-1 to FIG. 7c-3).

Operation 810: The communications device randomly switches to the beam b1, the beam b2, or the beam b3 again to perform clear channel assessment.

In the foregoing implementation, that the communications device switches to the beam associated with the beam a1 to perform clear channel assessment is further described:

(1) In operation 801, operation 804, and operation 807, when the communications device switches to the beam b1, the beam b2, or the beam b3 to perform clear channel assessment, a historical value of a backoff counter for the beam a1 is set to a value (namely, m3) of a backoff counter for the beam.

(2) When the communications device switches to the beam b1, the beam b2, or the beam b3 to perform a backoff, and the backoff is interrupted, the communications device records a current value of a backoff counter (namely, a historical value of the backoff counter), and in operation 810, when the communications device switches to the beam again to perform a backoff, the historical value of the backoff counter for the beam is directly set to a value of the backoff counter.

It should be noted that, an example in which the communications device randomly switches to the beam b1, the beam b2, or the beam b3 to perform clear channel assessment is used in the foregoing description of FIG. 8A and FIG. 8B. In another implementation, alternatively, the communications device may switch to a corresponding beam based on quantities of times of backoff interruption on the beam b1, the beam b2, and the beam b3, and/or historical values of backoff counters for the beam b1, the beam b2, and the beam b3, to perform clear channel assessment.

For example, when determining to switch to the beam associated with the beam a1 to perform clear channel assessment, the communications device learns, by counting, that the quantity of times of backoff interruption on the beam b1 is 50, the quantity of times of backoff interruption on the beam b2 is 30, and the quantity of times of backoff interruption on the beam b3 is 20. In this way, in operation 801, the communications device switches from the beam a1 to the beam b3 with a smallest quantity of times of backoff interruption to perform clear channel assessment; in operation 804, the communications device switches from the beam b3 to the beam b2 with a relatively small quantity of times of backoff interruption to perform clear channel assessment; in operation 807, the communications device randomly switches from the beam b2 to the beam b1 to perform clear channel assessment.

When the communications device performs clear channel assessment on the beam associated with the beam a1, if the communications device determines that a second preset condition is satisfied, the communications device may switch to the beam a1 to perform clear channel assessment, and when the communications device switches to the beam a1 to perform clear channel assessment, a value of the backoff counter for the beam a1 may be set based on the historical value of the backoff counter for the beam associated with the beam a1 and a historical value of the backoff counter for the beam a1. For example, the historical value of the backoff counter for the beam a1 may directly be set to the value of the backoff counter for the beam a1. For another example, a largest value in historical values of backoff counters for the beams associated with the beam a1 may be set to the value of the backoff counter for the beam a1.

The second preset condition may include any one or any combination of the following: (1) The communications device determines that duration of performing clear channel assessment on the beam associated with the beam a1 is greater than or equal to a fourth threshold. (2) The communications device determines that a quantity of times of backoff interruption on the beam associated with the beam a1 is greater than or equal to a fifth threshold.

Figure 9:
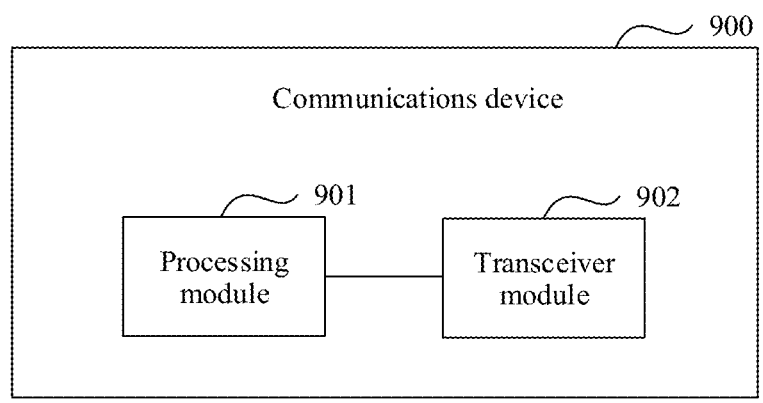
FIG. 9 is a schematic structural diagram of a communications device according to the present disclosure.
Figure 10:
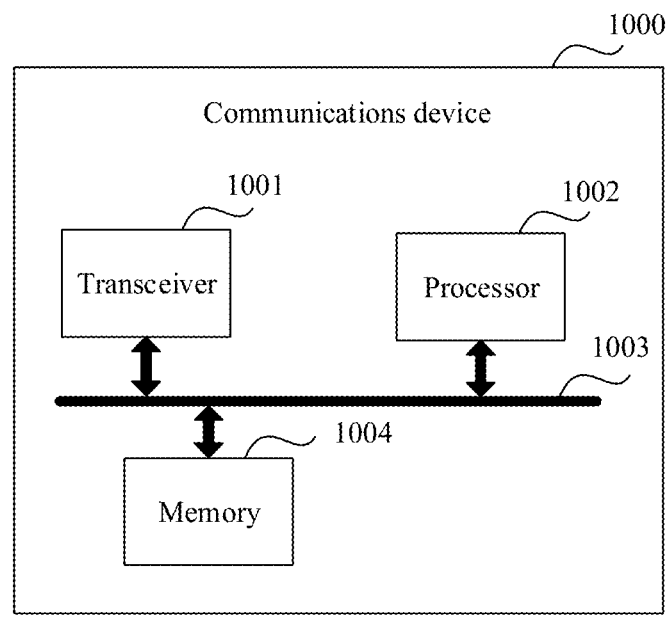
FIG. 10 is a schematic structural diagram of another communications device according to the present disclosure.

The following describes a communications device related to the present disclosure with reference to FIG. 9 and FIG. 10.

Referring to FIG. 9, in a specific embodiment, the present disclosure provides a communications device. The communications device includes:

a processing module 901, configured to perform clear channel assessment on a first beam, and in a process of the clear channel assessment, perform a backoff based on a backoff control parameter for the first beam, where the communications device has a plurality of optional beams, the first beam is one of the plurality of optional beams, and the backoff control parameter is set based on a historical value of a backoff control parameter for at least one of the plurality of optional beams; and a transceiver module 902, configured to: after the backoff succeeds, perform transmission by using the first beam.

In one embodiment, the plurality of optional beams are divided into a plurality of beam subsets; and the backoff control parameter is set based on a historical value of a backoff control parameter for a beam in another beam subset in the plurality of beam subsets except a beam subset in which the first beam is located and/or a historical value of the backoff control parameter for the first beam.

In one embodiment, the backoff control parameter is set based on a historical value of a backoff control parameter for a beam that is in the plurality of optional beams and that is associated with the first beam and/or a historical value of the backoff control parameter for the first beam, where the beam associated with the first beam is associated with the first beam based on spatial ranges covered by the beams.

In one embodiment, if neither the backoff control parameter for the beam associated with the first beam nor the backoff control parameter for the first beam has a historical value, the backoff control parameter is set based on a preset upper limit; and the preset upper limit is set based on historical values of backoff control parameters for the plurality of optional beams and/or quantities of times of backoff interruption on the plurality of optional beams.

In one embodiment, the processing module 901 is further configured to:

update the preset upper limit if the processing module 901 determines that a sum of the quantities of times of backoff interruption on the plurality of optional beams is greater than or equal to a first threshold, and/or a sum of the historical values of the backoff control parameters for the plurality of optional beams is greater than or equal to a second threshold.

In one embodiment, the processing module 901 is specifically configured to:

if the processing module 901 determines that a quantity of times of backoff interruption on the first beam is greater than or equal to a third threshold, switch to the beam associated with the first beam to perform clear channel assessment.

In one embodiment, a spatial range covered by the beam associated with the first beam is less than a spatial range covered by the first beam; and the processing module 901 is specifically configured to:

sequentially perform, in ascending order based on historical values of backoff control parameters for beams associated with the first beam, clear channel assessment on the beams associated with the first beam.

In one embodiment, the processing module 901 is specifically configured to:

switch to the first beam to perform clear channel assessment if the processing module 901 determines that duration of performing clear channel assessment on the beam associated with the first beam is greater than or equal to a fourth threshold, and/or a quantity of times of backoff interruption during clear channel assessment on the beam associated with the first beam is greater than or equal to a fifth threshold.

It should be noted that, module division in this embodiment of the present disclosure is an example, and is merely a logical function division. In actual implementation, another division manner may be used. Functional modules in this embodiment of the present disclosure may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

In another specific embodiment, a structure of a communications device includes a processor and a transceiver, configured to perform the channel listening method shown in FIG. 3. The processor is configured to perform clear channel assessment on a first beam, and in a process of the clear channel assessment, perform a backoff based on a backoff control parameter for the first beam; and the communications device has a plurality of optional beams, the first beam is one of the plurality of optional beams, and the backoff control parameter is set based on a historical value of a backoff control parameter for at least one of the plurality of optional beams. The transceiver is configured to: after the backoff succeeds, perform transmission by using the first beam. For specific details of performing the channel listening method by the communications device, refer to the descriptions of FIG. 3 to FIG. 8A and FIG. 8B. Details are not described herein again.

FIG. 10 is a schematic diagram of a possible simplified structure of a communications device. In an example corresponding to FIG. 10, a structure of the communications device includes a transceiver 1001, a processor 1002, a bus 1003, and a memory 1004. In an implementation shown in FIG. 10, the transceiver 1001 is integrated by a transmitter and a receiver. In another implementation, the transmitter and the receiver may alternatively be independent of each other.

In a possible manner, the transceiver 1001, the processor 1002, and the memory 1004 may be interconnected by using the bus 1003. The bus 1003 may be a peripheral component interconnect (PCI) bus, an extended industry standard architecture (EISA) bus, or the like. The bus 1003 may be classified into an address bus, a data bus, a control bus, and the like. For ease of representation, only one thick line is used to represent the bus in FIG. 10, but this does not mean that there is only one bus or only one type of bus.

The processor 1002 is configured to control and manage an action of the communications device, and is configured to perform processing performed by the communications device in the foregoing embodiments, for example, configured to perform clear channel assessment on the first beam, and in a process of the clear channel assessment, perform a backoff based on the backoff control parameter for the first beam; and after the backoff succeeds, configured to control the transceiver 1001 to perform transmission by using the first beam, and/or perform another process of the technology described in the present disclosure. The processor 1002 performs clear channel assessment based on a signal received by the transceiver 1001 from an antenna (not shown in the figure). In different implementations, the processor 1002 may include one or more processors, for example, include one or more central processing units (CPU). The processor 1002 may be integrated into a chip, or may be a chip itself.

The memory 1004 is configured to store a related instruction and related data, and program code and data of the network device. In different implementations, the memory 1004 includes but is not limited to a random access memory (RAM), a read-only memory (ROM), an erasable programmable read-only memory (EPROM), or a compact disc read-only memory (CD-ROM).

It can be understood that FIG. 10 shows merely a simplified design of the communications device. When the communications device is a terminal device or a network device such as a base station, the communications device may include any quantity of transmitters, receivers, processors, memories, other components, or the like, and all communications devices that can implement the channel listening method in the present disclosure fall within the protection scope of the present disclosure.

In addition, the present disclosure further provides a communications apparatus, configured to perform the methods related to actions of the communications device in FIG. 2 to FIG. 8A and FIG. 8B. The communications apparatus may be a chip or a processing circuit. For example, the chip or the processing circuit may be disposed in a network device or a terminal device. In different implementations, the chip may include a memory, or may not include a memory.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Definitely, a person skilled in the art can make various modifications and variations to the embodiments of the present disclosure without departing from the scope of the present disclosure. The present disclosure is intended to cover these modifications and variations provided that they fall within the scope of protection defined by the following claims and their equivalent technologies.

What is claimed is:

1. A channel listening method applied to an unlicensed frequency band, wherein the method comprises:
performing, by a communications device, clear channel assessment on a first beam, and in a process of the clear channel assessment, performing, by the communications device, a backoff based on a backoff control parameter for the first beam, wherein the communications device has a plurality of optional beams, the first beam is one of the plurality of optional beams, and the backoff control parameter is set based on a historical value of a backoff control parameter for at least one beam of the plurality of optional beams, wherein the backoff control parameter is set based on the historical value of the backoff control parameter for the at least one beam of the plurality of optional beams associated with the first beam or a historical value of the backoff control parameter for the first beam, wherein the at least one beam associated with the first beam is associated with the first beam based on spatial ranges covered by the plurality of optional beams, and wherein if neither the backoff control parameter for the at least one beam associated with the first beam nor the backoff control parameter for the first beam has a historical value, the backoff control parameter is set based on a preset upper limit; and
after the backoff succeeds, performing, by the communications device, transmission by using the first beam.

2. The method according to claim 1, wherein the plurality of optional beams are divided into a plurality of beam subsets; and
wherein the backoff control parameter is set further based on a historical value of a backoff control parameter for a beam in another beam subset in the plurality of beam subsets except a beam subset in which the first beam is located and/or a historical value of the backoff control parameter for the first beam.

3. The method according to claim 1, wherein the backoff control parameter is set further based on the historical value of the backoff control parameter for the at least one beam of the plurality of optional beams associated with the first beam and a historical value of the backoff control parameter for the first beam.

4. The method according to claim 1, wherein
the preset upper limit is set based on historical values of backoff control parameters for the plurality of optional beams and/or quantities of times of backoff interruption on the plurality of optional beams.

5. The method according to claim 1, wherein the method further comprises:
updating, by the communications device, the preset upper limit if the communications device determines that a sum of quantities of times of backoff interruption on the plurality of optional beams is greater than or equal to a first threshold, and/or a sum of the historical values of the backoff control parameters for the plurality of optional beams is greater than or equal to a second threshold.

6. A communications device, wherein the communications device comprises a processor and a transceiver;
the processor is configured to perform clear channel assessment on a first beam, and in a process of the clear channel assessment, perform a backoff based on a backoff control parameter for the first beam; and the communications device has a plurality of optional beams, the first beam is one of the plurality of optional beams, and the backoff control parameter is set based on a historical value of a backoff control parameter for at least one beam of the plurality of optional beams, wherein the backoff control parameter is set based on the historical value of the backoff control parameter for the at least one beam of the plurality of optional beams associated with the first beam or a historical value of the backoff control parameter for the first beam, wherein the at least one beam associated with the first beam is associated with the first beam based on spatial ranges covered by the plurality of optional beams, and wherein if neither the backoff control parameter for the at least one beam associated with the first beam nor the backoff control parameter for the first beam has a historical value, the backoff control parameter is set based on a preset upper limit; and
the transceiver is configured to: after the backoff succeeds, perform transmission by using the first beam.

7. The communications device according to claim 6, wherein the plurality of optional beams are divided into a plurality of beam subsets; and
wherein the backoff control parameter is set further based on a historical value of a backoff control parameter for a beam in another beam subset in the plurality of beam subsets except a beam subset in which the first beam is located and/or a historical value of the backoff control parameter for the first beam.

8. The communications device according to claim 6, wherein the backoff control parameter is set further based on the historical value of the backoff control parameter for the at least one beam of the plurality of optional beams associated with the first beam and the historical value of the backoff control parameter for the first beam.

9. The communications device according to claim 6, wherein
the preset upper limit is set based on historical values of backoff control parameters for the plurality of optional beams and/or quantities of times of backoff interruption on the plurality of optional beams.

10. The communications device according to claim 6, wherein the processor is further configured to:
update the preset upper limit if the processor determines that a sum of quantities of times of backoff interruption on the plurality of optional beams is greater than or equal to a first threshold, and/or a sum of the historical values of the backoff control parameters for the plurality of optional beams is greater than or equal to a second threshold.

11. A non-transitory computer-readable medium having instructions stored therein, which when executed by a processor of a communications device, cause the communications device to perform operations, the operations comprising:
performing clear channel assessment on a first beam, and in a process of the clear channel assessment, performing a backoff based on a backoff control parameter for the first beam, wherein the communications device has a plurality of optional beams, the first beam is one of the plurality of optional beams, and the backoff control parameter is set based on a historical value of a backoff control parameter for at least one beam of the plurality of optional beams, wherein the backoff control parameter is set based on the historical value of the backoff control parameter for the at least one beam of the plurality of optional beams associated with the first beam or a historical value of the backoff control parameter for the first beam, wherein the at least one beam associated with the first beam is associated with the first beam based on spatial ranges covered by the plurality of optional beams, and wherein if neither the backoff control parameter for the at least one beam associated with the first beam nor the backoff control parameter for the first beam has a historical value, the backoff control parameter is set based on a preset upper limit; and after the backoff succeeds, performing transmission by using the first beam.

12. The non-transitory computer-readable medium according to claim 11, wherein the plurality of optional beams are divided into a plurality of beam subsets; and
wherein the backoff control parameter is set further based on a historical value of a backoff control parameter for a beam in another beam subset in the plurality of beam subsets except a beam subset in which the first beam is located and/or a historical value of the backoff control parameter for the first beam.

13. The non-transitory computer-readable medium according to claim 11, wherein the backoff control parameter is set further based on the historical value of the backoff control parameter for the at least one beam of the plurality of optional beams associated with the first beam and the historical value of the backoff control parameter for the first beam.

14. The non-transitory computer-readable medium according to claim 11, wherein
the preset upper limit is set based on historical values of backoff control parameters for the plurality of optional beams and/or quantities of times of backoff interruption on the plurality of optional beams.

15. The non-transitory computer-readable medium according to claim 11, wherein the operations further comprise:
updating the preset upper limit if the communications device determines that a sum of quantities of times of backoff interruption on the plurality of optional beams is greater than or equal to a first threshold, and/or a sum of the historical values of the backoff control parameters for the plurality of optional beams is greater than or equal to a second threshold.

* * * * *